Figure 1:
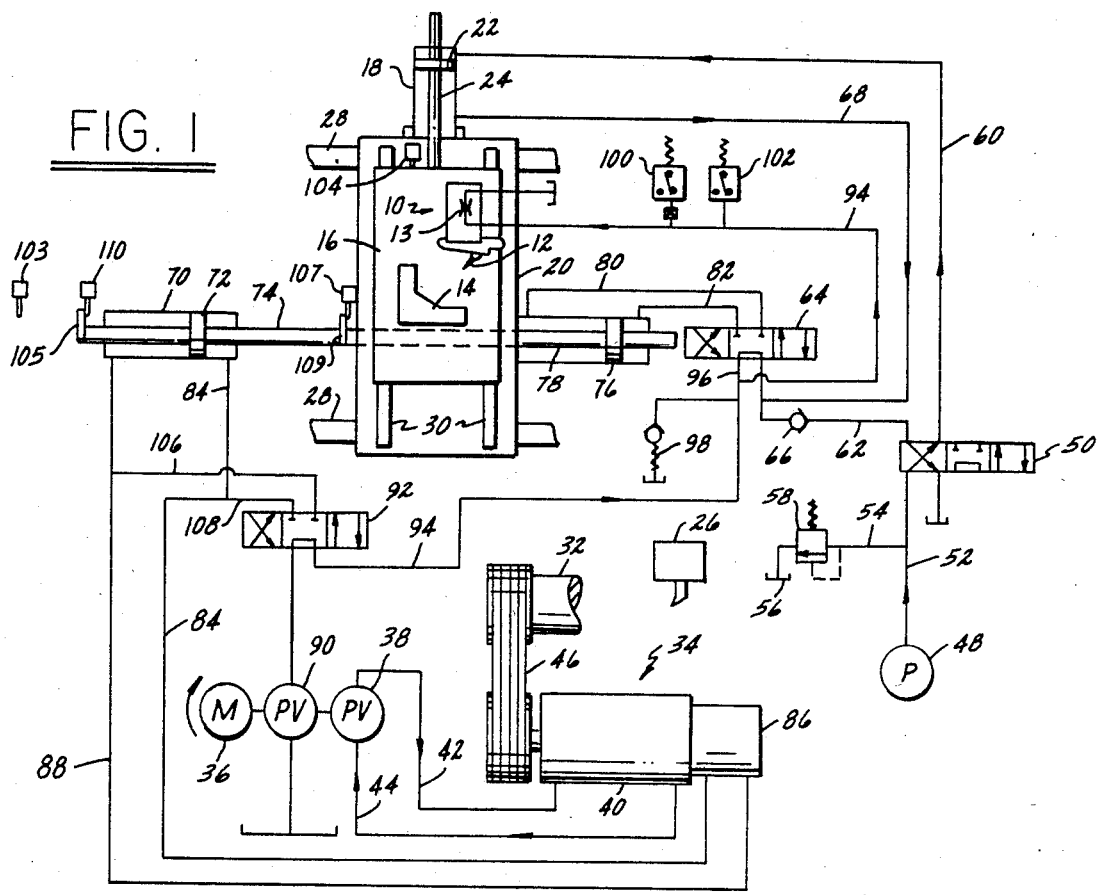

United States Patent [19]

Cudnohufsky

[11] Patent Number: 4,593,586

[45] Date of Patent: Jun. 10, 1986

[54] TRACER CONTROL CIRCUIT FOR MACHINE TOOLS

[75] Inventor: Gerald G. Cudnohufsky, Drayton Plains, Mich.

[73] Assignee: Programmable Tracing Incorporated, Madison Heights, Mich.

[21] Appl. No.: 618,229

[22] Filed: Jun. 7, 1984

[51] Int. Cl.[4] .............................................. B23B 3/28
[52] U.S. Cl. .................... 82/14 A; 82/21 A; 91/37; 251/3; 409/129
[58] Field of Search ............. 82/14 A, 21 A; 409/129; 251/3; 91/37

[56] References Cited

U.S. PATENT DOCUMENTS

| 2,940,263 | 6/1960 | Cudnohufsky | 82/14 A |
| 3,104,591 | 9/1963 | Cudnohufsky | 251/3 |
| 3,820,439 | 6/1974 | Cudnohufsky | 251/3 |

FOREIGN PATENT DOCUMENTS

| 2630790 | 1/1977 | Fed. Rep. of Germany | 82/21 A |
| 994127 | 2/1983 | U.S.S.R. | 82/21 A |

*Primary Examiner*—Francis S. Husar
*Assistant Examiner*—Jerry Kearns

*Attorney, Agent, or Firm*—Barnes, Kisselle, Raisch, Choate, Whittemore & Hulbert

[57] ABSTRACT

The piston rod of a longitudinal feed cylinder of a tracer controlled lathe is connected with the lathe carriage by means of an operative connection consisting of another hydraulic cylinder or a cam arrangement which permits the rod of the feed cylinder to continue movement in the feed direction while maintaining the carriage in a fixed position. This permits the cutting tool mounted on the cross slide to machine a sharp shoulder on the workpiece perpendicular to the axis of rotation of the lathe spindle. The circuit includes a tracer valve that is variably restricted in accordance with movement of a stylus following a contoured template. The tracer valve is conneted to a feed line from a high pressure pump which extends directly or indirectly to one side of a hydraulic cylinder for displacing the cross slide in the carriage. The opposite side of the cross slide cylinder is connected to a low pressure pump. The pressure differential across the cross slide cylinder controls the operative connection between the longitudinal feed cylinder and the carriage to vary the effective rate of movement of the carriage in the longitudinal feed direction.

6 Claims, 11 Drawing Figures

TRACER CONTROL CIRCUIT FOR MACHINE TOOLS

This invention relates to a hydraulic tracer control circuit for governing the operation of a pattern controlled machine tool.

One of the problems encountered with prior hydraulic tracer control circuits is that the longitudinal feed of a tool has to be stopped abruptly when the stylus on the tracer valve encounters a sharp shoulder on the template that extends transversely of the longitudinal feed direction. Unless the longitudinal feed of the cutting tool is stopped abruptly when the stylus encounters such a shoulder the cutting tool will "overshoot" the desired path of travel and will therefore machine a workpiece that does not conform in contour to the template. This problem can be minimized to some extent by reducing the longitudinal feed rate of the cutting tool, but this increases the machine cycle time.

In prior art tracer control circuits the feed rate is normally controlled by the use of flow control valves connected to the feed cylinders so as to meter the flow from the cylinders in order to obtain the desired feed rate. Such valves are not only costly, but they are subject to malfunction. The use of flow control valves to meter the flow rate of the cutting tool also requires a large volume of oil which in turn necessitates large fluid lines and large pumps.

Tracer circuits heretofore proposed also require numerous valves which have to be precisely adjusted relative to one another under various conditions of operation. Such valves not only require precise adjustment, but also require a change of adjustment for each different operating condition.

The primary object of this invention is to provide a simple control circuit which avoids the problems referred to above.

A more specific object of this invention is to incorporate in a tracer control circuit a carriage drive member which, during a machining cycle, is driven at a predetermined rate in the feed direction and which is connected with the carriage by a mechanism responsive to the degree of restriction at the tracer valve for shifting the carriage in opposite directions relative to the drive member and thereby vary the effective rate of travel of the carriage in the longitudinal feed direction.

Another object of this invention is to provide a tool carriage feed cylinder in a closed loop circuit with a pump which requires a relatively small amount of oil to keep the system fully charged.

A further object of the invention is to provide a tracer control circuit which requires a minimum number of adjustable valves, the valves once adjusted requiring little or no further adjustment under changing conditions of operation of the machine tool.

Other objects, features and advantages of the present invention will become apparent from the following description and accompanying drawings, in which:

FIGS. 1 thru 6 are diagrammatic views of one form of tracer control circuit according to the present invention, the successive views illustrating the circuit components in the positions assumed at the successive stages of a machining cycle; and FIGS. 7 thru 11 are views similar to FIGS. 1 thru 6 showing a slightly modified control circuit according to the present invention.

In the drawings the tracer valve employed in the circuit is generally designated 10 and has a stylus 12 pivotally mounted thereon for tracing the contour of a pattern or template 14. The contour of the template 14 corresponds to the contour desired to be machined on a workpiece. Tracer valve 10 is of the type disclosed in U.S. Pat. No. 2,940,263 and need not be described in detail. For the purpose of this description it will suffice to state that valve 10 has a restrictable orifice 13 therein and the degree of its restriction depends upon the pivotal movement of stylus 12. In the embodiment illustrated the hydraulic pressure in valve 10 tends to pivot stylus 12 in a clockwise direction to reduce restriction at orifice 13. Pivotal movement of stylus 12 in a counterclockwise direction increases the restriction in valve 10.

To illustrate the operation of the improved control circuit of this invention it may be assumed that the tracer is used on a lathe. On a machine tool such as a lathe the template 14 is mounted in a fixed position on the bed of the lathe and the tracer valve 10 is mounted on the cross slide of the lathe which is generally designated 16. A cylinder 18 mounted on the carriage 20 of the lathe has a piston 22 connected by a rod 24 to cross slide 16. A cutting tool 26 is mounted on cross slide 16 to move therewith. Carriage 20 is movable on ways 28 in a longitudinal direction and cross slide 16 is movable on ways 30 in a direction transverse to the longitudinal feed direction of carriage 20.

The machine tool spindle 32, which, in the case of a lathe, rotates the workpiece, may be driven by any suitable power unit. However, in the case of the present invention it is preferred to drive spindle 32 by means of a hydrostatic transmission 34. The preferred form of hydrostatic transmission comprises an electric motor 36 which drives a variable displacement pump 38 which in turn drives a variable displacement hydraulic motor 40. The hydraulic lines connecting motor 40 and pump 38 are designated 42,44. The output shaft of hydraulic motor 40 is connected in driving relationship with spindle 32 by a belt drive 46. The means employed for stroking pump 38 and motor 40 to vary the displacement thereof are not illustrated. These means can take any suitable form, such as cams, limit switches, programmable controllers, etc. During a particular machining cycle the displacement of pump 38 is maintained constant and it is stroked only at the beginning and at the end of the cycle to produce a clutching and braking action. The displacement of motor 40 is varied during the machining cycle so that the speed of spindle 32 varies inversely with the diameter of the surface being machined on the workpiece so that the rate of removal of stock will be constant per unit of time.

A low pressure pump 48 driven by motor 36 is connected to a four-way valve 50 by means of a feed line 52. A branch line 54 from feed line 52 is connected to sump 56 through an adjustable relief valve 58. One port of valve 50 is connected to the upper end of cylinder 18 by a feed line 60. Valve 50 is also connected by a line 62 with a port on another four-way valve 64. A check valve 66 in line 62 prevents the flow therein in a direction from valve 64 to valve 50. On the downstream side of check valve 66 line 62 is connected to the lower end of cylinder 18 by a line 68. Cross slide 16 is displaced in the transverse direction on carriage 20 by the differential pressure across piston 22.

Within a longitudinal feed cylinder 70 fixedly mounted on the lathe there is arranged a piston 72, the rod 74 of which is connected to a piston 76 slideably arranged within a cylinder 78. Cylinder 78 is fixedly mounted on carriage 20. The opposite ends of cylinder 78 are connected by lines 80,82 with ports on valve 64. One end of longitudinal feed cylinder 70 is connected by a feed line 84 with the outlet port of a variable displacement pump 86. The inlet of pump 86 is connected in a closed loop circuit with the other end of cylinder 70 by means of a line 88. Pump 86 is driven by hydraulic motor 40.

Pressure fluid is supplied to tracer valve 10 by a pump 90 that is capable of developing a substantially higher pressure than pump 48. The outlet of pump 90 is connected to a four-way valve 92 which in turn is connected by a line 94 to the orifice 13 of valve 10. A branch line 96 extends from line 94 to one port of valve 64. Within line 94 there is arranged an adjustable relief valve 98 for setting the maximum allowable pressure in the system and also two pressure switches 100,102. Switch 100 is set at a high pressure to energize the solenoids of valves 50 and 92 to shift these valves to the positions shown in FIG. 6 and thereby return carriage 20 and cross slide 16 to the start position when the pressure in line 94 exceeds a predetermined high value, for example 1500 p.s.i. Pressure switch 102, when actuated, strokes pump 86 to a desired preset feed rate and also shifts valve 64 to the left from the centered position shown in FIG. 1 to the position shown in FIG. 2 when stylus 12 engages template 14.

FIG. 1 illustrates the position of the components in the system at the start of a machining cycle wherein the stylus 12 is approaching the template and, correspondingly, the tool 26 is approaching the workpiece (not shown). When a cycle start switch (not shown) is actuated, valve 50 is shifted to the right from its centered position to direct hydraulic fluid from pump 48 through line 60 to the upper end of cylinder 18. The maximum pressure in line 60 is determined by the setting of relief valve 58. For the purpose of this description we will assume that valve 58 is set to open at 500 p.s.i.

At the beginning of a machining cycle stylus 12 is spaced from the template. Tracer valve 10 is, therefore, wide open and the oil flowing therethrough is merely directed to sump. However, with valve 50 in the position shown in FIG. 1 fluid at a pressure determined by the setting of relief valve 58 (say, for example, 500 p.s.i.) is directed to the upper end of cylinder 18 through line 60. Fluid is discharged from the lower end of cylinder 18 through line 68, the open center of valve 64, branch line 96 and line 94 through the tracer valve and to sump. The cross slide is thereby advanced downwardly. At this time pump 86 is stroked to zero and, therefore, fluid is neither admitted to nor discharged from said cylinder 70.

Figure 2:
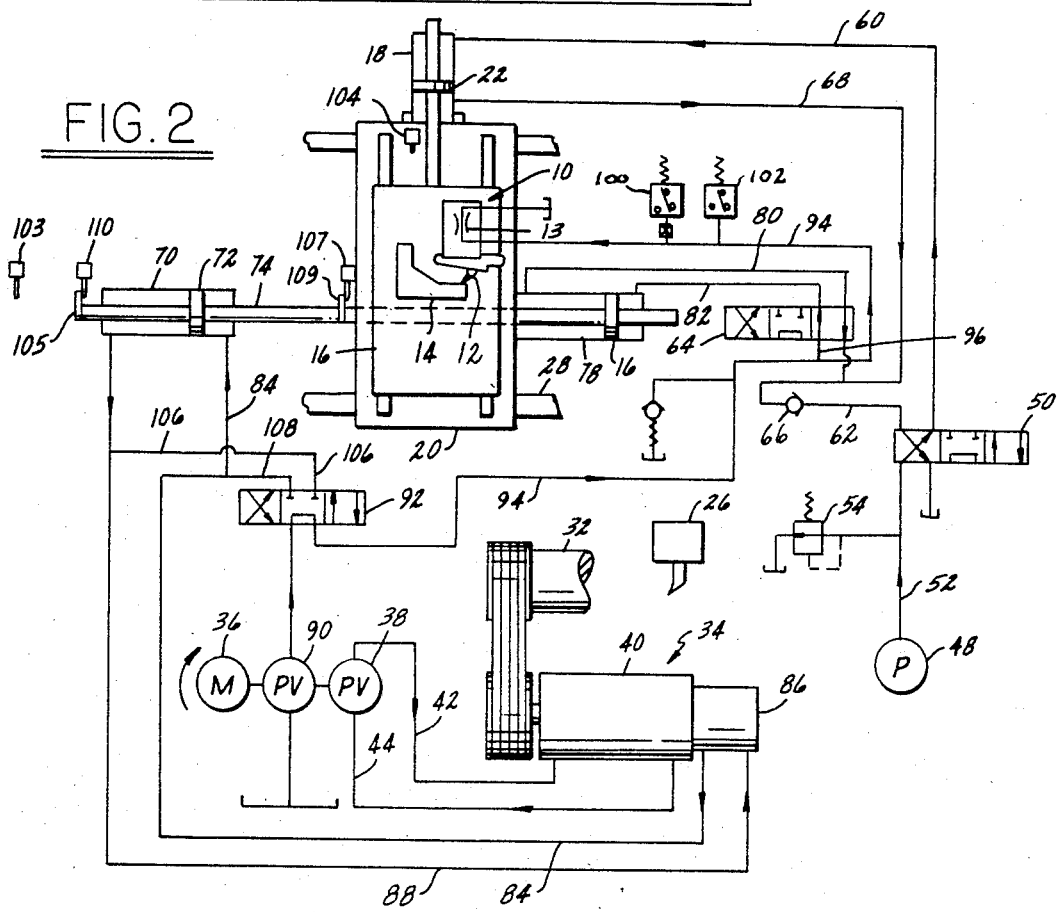
Figure 3:
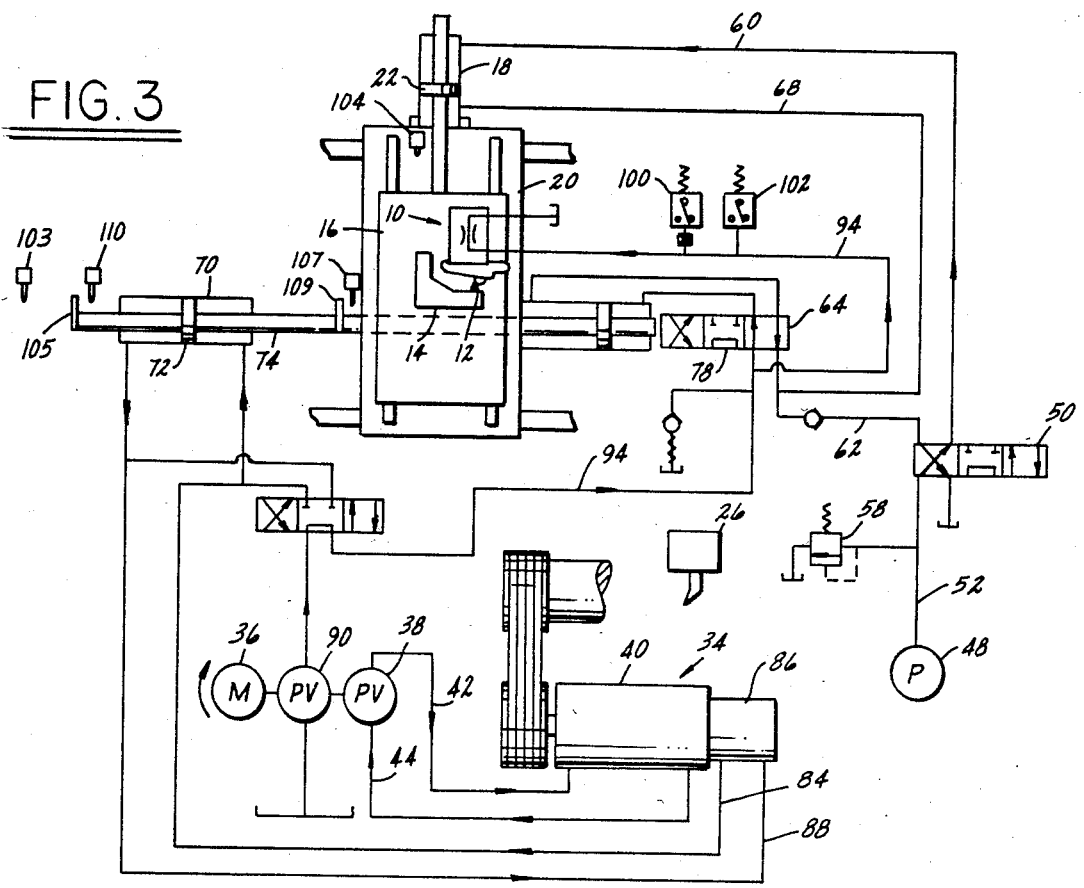

When stylus 12 engages template 14 as shown in FIG. 2, pump 86 is stroked to the preset feed rate and piston 72 in cylinder 70 is advanced to the left in the feed direction at a preset rate. As soon as the stylus engages the template as shown in FIG. 2 the orifice 13 becomes restricted, thus causing the back pressure in line 94 to rise to substantially the same value as the pressure in line 60. At this pressure (500 p.s.i.) switch 102 is actuated to shift the spool of valve 64 to the position shown in FIG. 2 and to stroke pump 86 to the preset feed rate. Movement of piston 72 in cylinder 70 in the longitudinal feed direction to the left is initiated. This same pressure of 500 p.s.i. is also applied to the lower end of cylinder 18 through line 68. It will be understood that the pressure in these lines 60,68 is equalized by reason of the restriction at orifice 13 caused by the extent of pivotal movement of stylus 12 when it engages template 14. Since line 80 from one end of the carriage drive cylinder 78 is connected through valve 64 with line 68 and the line 82 from the other end of cylinder 78 is connected through valve 64 with line 94, it follows that the pressures on the opposite sides of piston 76 in cylinder 78 will also be at approximately 500 p.s.i. Therefore, piston 76 will not be displaced relative to cylinder 78 and the carriage 20 will be advanced to the left in the feed direction at the rate determined by the stroke setting of pump 86. FIG. 2 shows the system just after the stylus has advanced to the left along the horizontal surface of the template. During this portion of the cycle tool 26 is machining a cylindrical surface on the workpiece.

Figure 4:
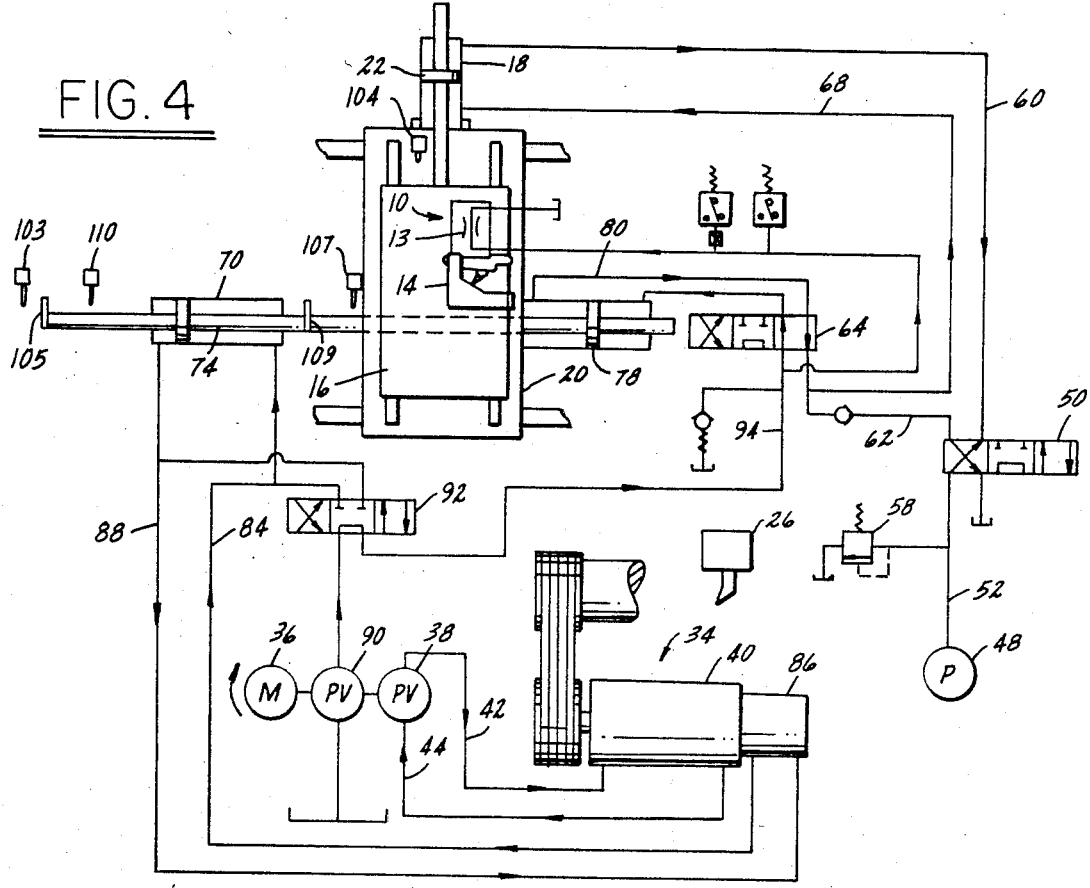

When the stylus engages the portion of the template which is inclined to the horizontal, the circuit assumes the condition illustrated in FIG. 4. As soon as the stylus encounters the inclined portion of the template, stylus 12 pivots further in a counterclockwise direction and the restriction at the tracer valve increases. The back pressure in line 94 will correspondingly increase to a value higher than obtained with the circuit in the condition illustrated in FIG. 3. Thus, the back pressure in line 94 will rise to say 550 p.s.i. and, since this line is connected through valve 64 to the right end of cylinder 78, the pressure in lines 80 and 68 will also rise to about 550 p.s.i. As a result, piston 22 will start to retract in an upward direction and cylinder 78 will start to shift in a direction to the right relative to piston 76. Since piston 76 is moving to the left at the predetermined feed rate and cylinder 78 is being displaced to the right relative to piston 76, it follows that carriage 20 will be displaced in the feed direction at a slower rate than when the stylus is traversing the horizontally disposed surface of the template.

Figure 5:
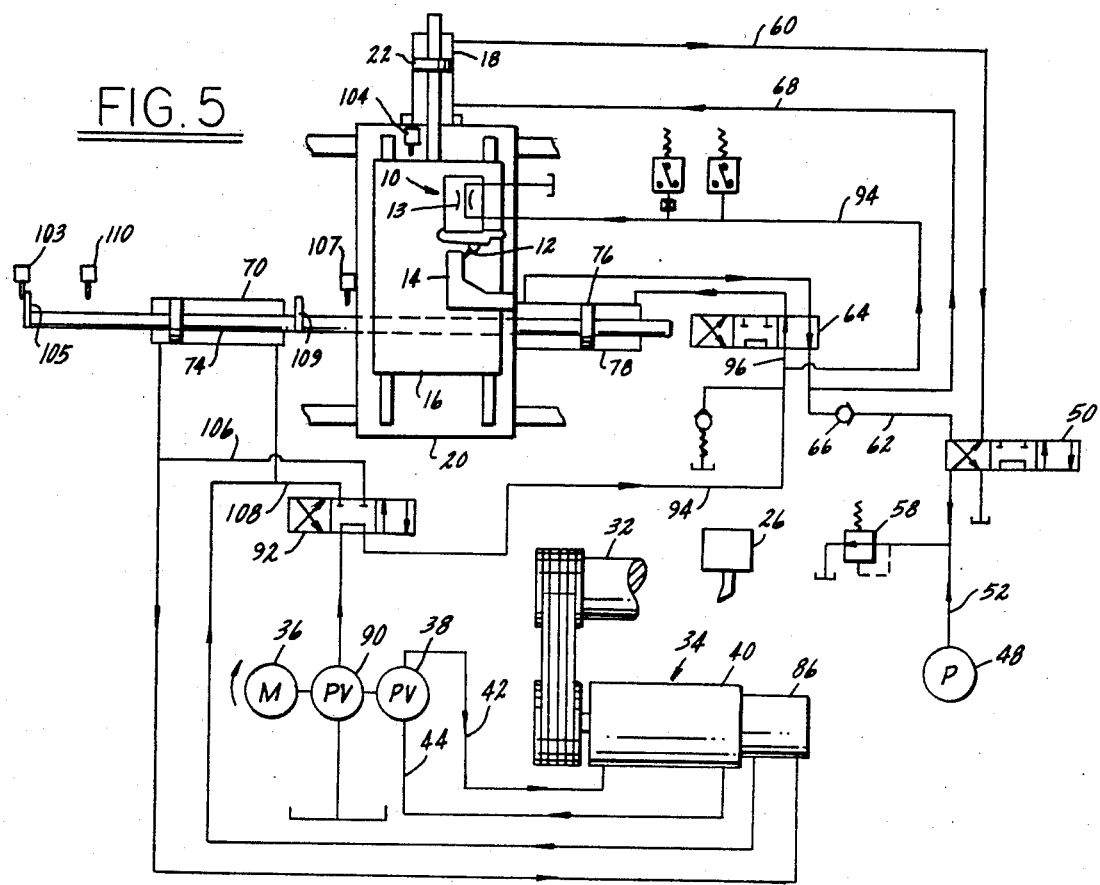
Figure 6:
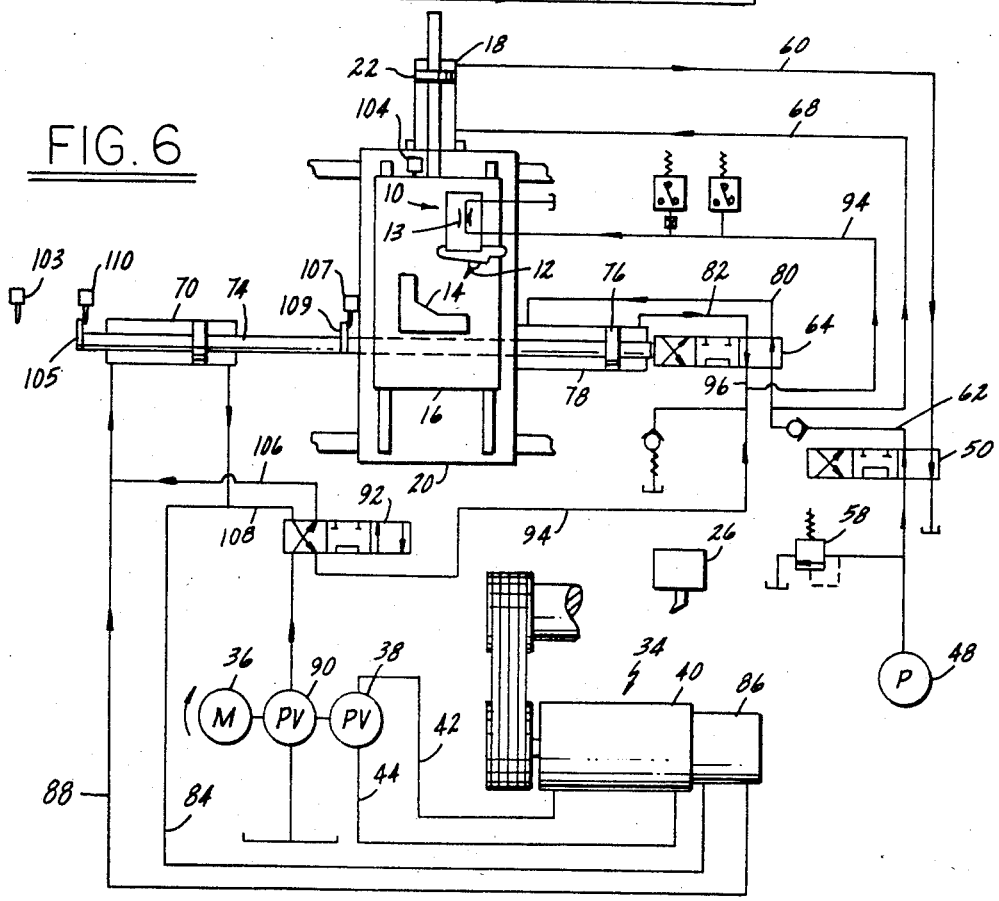

When the stylus encounters the vertically disposed portion of the template as shown in FIG. 5 the restriction at orifice 13 of the tracer valve 10 is further increased and the back pressure in line 94 rises to an even higher value, for example, 600 p.s.i. Therefore, the pressure at the right end of cylinder 78 also increases to about 600 p.s.i. and the rate at which cylinder 78 is displaced to the right relative to piston 76 is further increased to an extent such that the cylinder 78 is displaced to the right at the same rate as piston 76 is displaced to the left. Therefore the carriage remains stationary relative to the template. The cross slide 16 continues to retract upwardly on the stationary carriage 20 until the stylus rides to the upper end of template 14. Thereafter, as the rod 74 of cylinder 70 continues to move to the left, a dog 105 on rod 74 contacts an end-of-cycle switch 103 which strokes pump 86 to zero displacement and shifts valve 50 from the position shown in FIG. 5 to that shown in FIG. 6. This causes the cross slide to retract to the start position. When the cross slide reaches the fully retracted position it engages the limit switch 104 on the carriage Which shifts valve 92 from the position shown in FIG. 5 to that shown in FIG. 6. The outlet of pump 90 is thus connected to the end of cylinder 70 at the right by line 106 so as to retract the carriage to the start position. The oil discharged from the right end of cylinder 70 is directed by line 108 through valve 92 into line 94 which now extends to sump through the wide open tracer valve 10. The outlet of pump 48 directs fluid to the left end of cylinder 78 through line 80 and to the lower end of cylinder 18 through line 68. Thus, the carriage is fully retracted to the right and the cross slide is fully retracted to its uppermost position. Since at this time tracer valve 10 is wide open, the right end of cylinder 78 drains freely to sump through lines 82, 96 and 94. When the cylinder 78 fully retracts to the left, limit switch 107 on carriage 20 engages dog 109 on rod 74. When cross slide 16 returns to its fully retracted position it trips switch 104. When both switches 107 and 104 are actuated, valves 50 and 64 are returned to their center position. Likewise, when rod 74 retracts to the right to the start position, dog 105 engages a limit switch 110 which returns valve 92 to its centered position and conditions the circuit for initiating another machining cycle. It will be appreciated that means other than switches 103, 104, 107 and 110 may be utilized for programming purposes.

The arrangement shown in FIGS. 7 thru 11 differs from that previously described in that the valve 64 and cylinder 78 are replaced by a slide 112 and a cylinder 114 which acts as a spring. Hydraulic spring 114 comprises a cylinder having one end connected with the hydraulic line 52 of pump 48 by a branch line 116. Within fluid cylinder 114 there is arranged a piston 118, the rod 120 of which abuts or is connected with carriage 20 as at 122. Slide 112 is connected directly with the rod 74 of cylinder 70 and extends through carriage 20. On a portion of slide 112 that extends through carriage 20 there is formed a cam track 124 in which a cam follower 126 mounted on the back side of cross slide 16 is engaged. Cam track 124 is inclined at an acute angle to the vertical transverse path of travel of cross slide 16 on carriage 20. Spring 114 biases cam follower 126 against one side of cam track 124. Functionally slide 112, spring 114, cam track 124 and cam follower 126 serve the same purpose insofar as the rate of movement of carriage 20 in the feed direction is concerned as cylinder 78 and valve 64 in the arrangement illustrated in FIGS. 1 thru 6.

Figure 7:
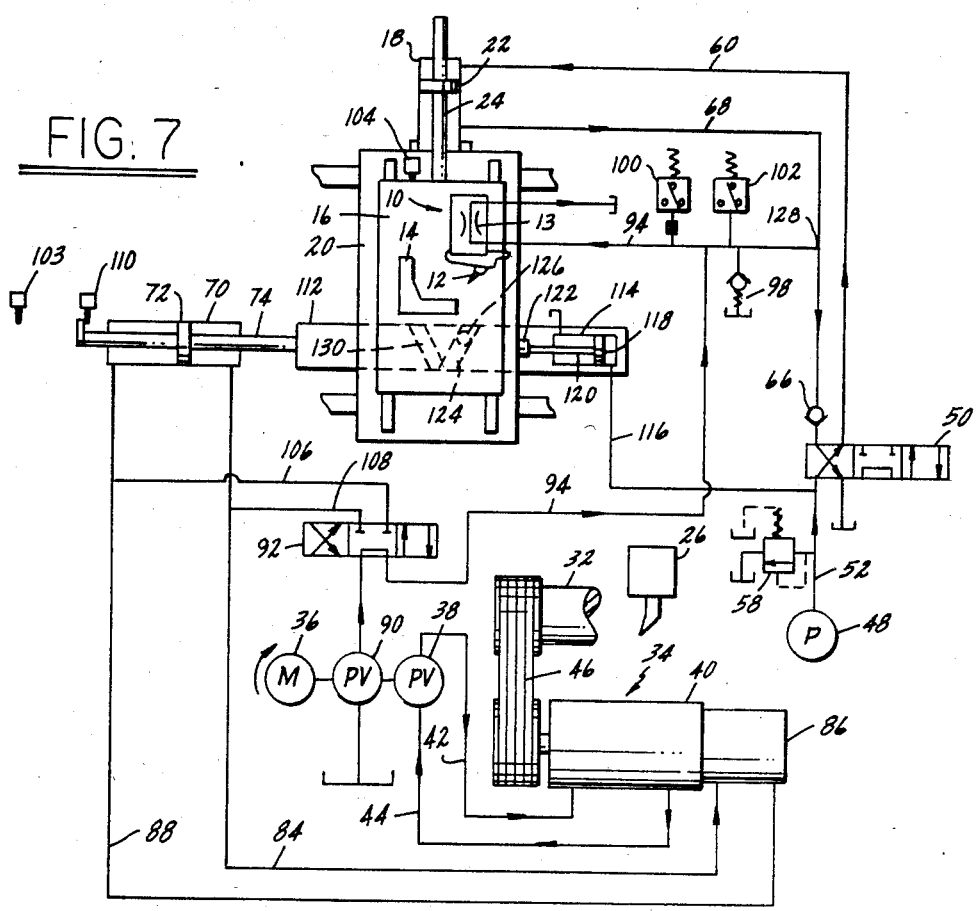

FIG. 7 illustrates the position of the components in the system shortly after a machining cycle has been initiated. At this stage of the cycle cam follower 126 is disposed adjacent the upper end of track 124. As the stylus 12 is approaching the template 14, the cam follower is displaced by track 124 downwardly and in a direction to the left. As explained previously in connection with the system illustrated in FIGS. 1 thru 6, when the stylus is approaching the template pump 86 has been stroked to zero displacement and the piston 72 remains in a fixed position within cylinder 70. Thus, slide 112 remains stationary and as the cross slide 16 is advanced downwardly, carriage 20 is displaced in a direction to the left.

Figure 8:
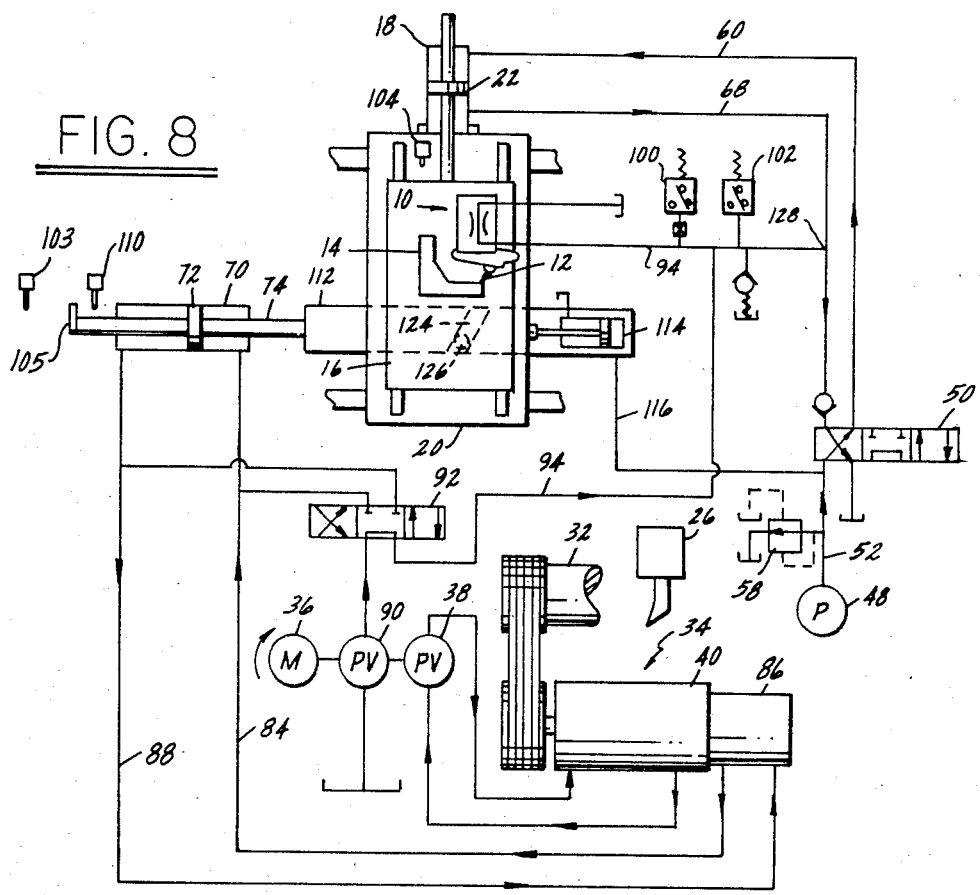

When stylus 12 engages the template as shown in FIG. 8 cam follower 126 is disposed adjacent the lower end of cam track 124. As explained previously in connection with FIG. 2, as soon as the stylus engages the template orifice 12 becomes restricted sufficiently to cause the back pressure in line 94 to the tracer valve to increase to a value which actuates pressure switch 102. Switch 102 strokes pump 86 to the preset feed rate and movement of slide 112 in the feed direction to the left is thereby initiated. As long as the stylus is traversing the horizontal edge portion of template 14 the pressure in lines 94, 60 and 68 remain at the setting of relief valve 58, for example, 500 p.s.i. Thus the cross slide 16 remains stationary relative to the carriage 20 and cam follower 126 is not displaced within cam track 124.

Figure 9:
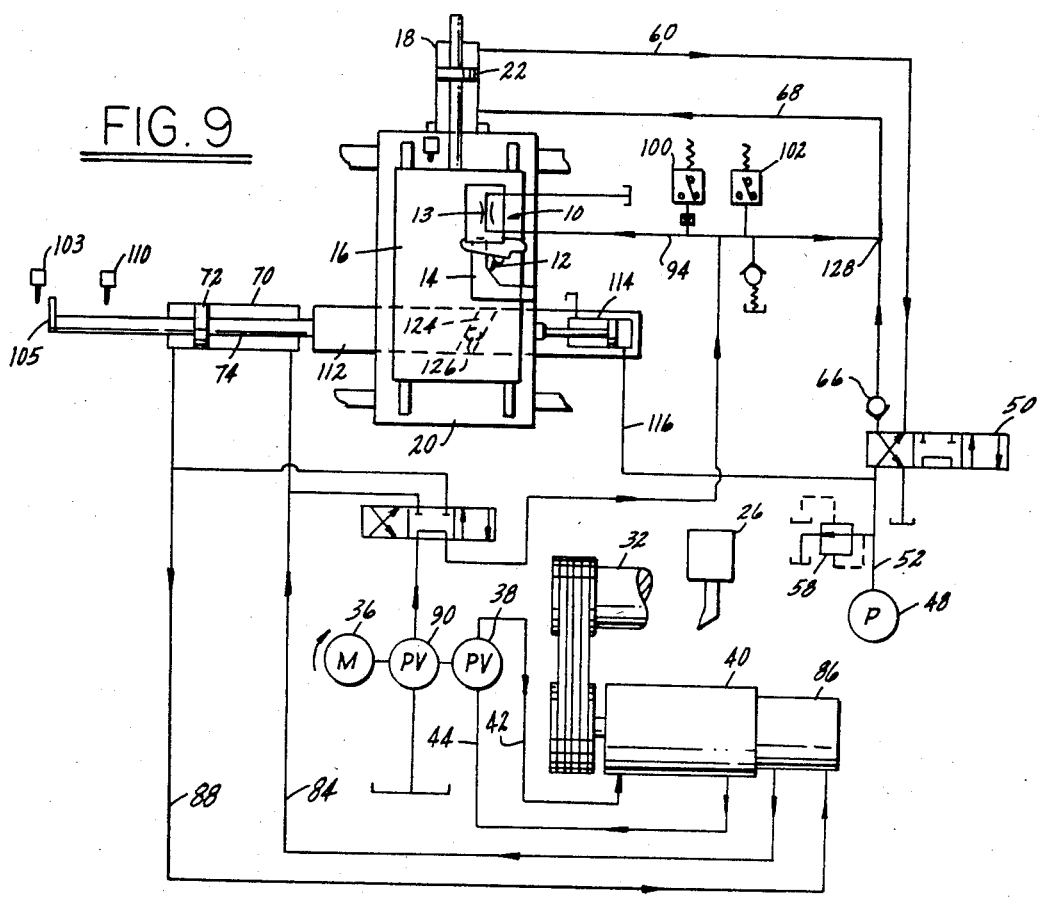
Figure 10:
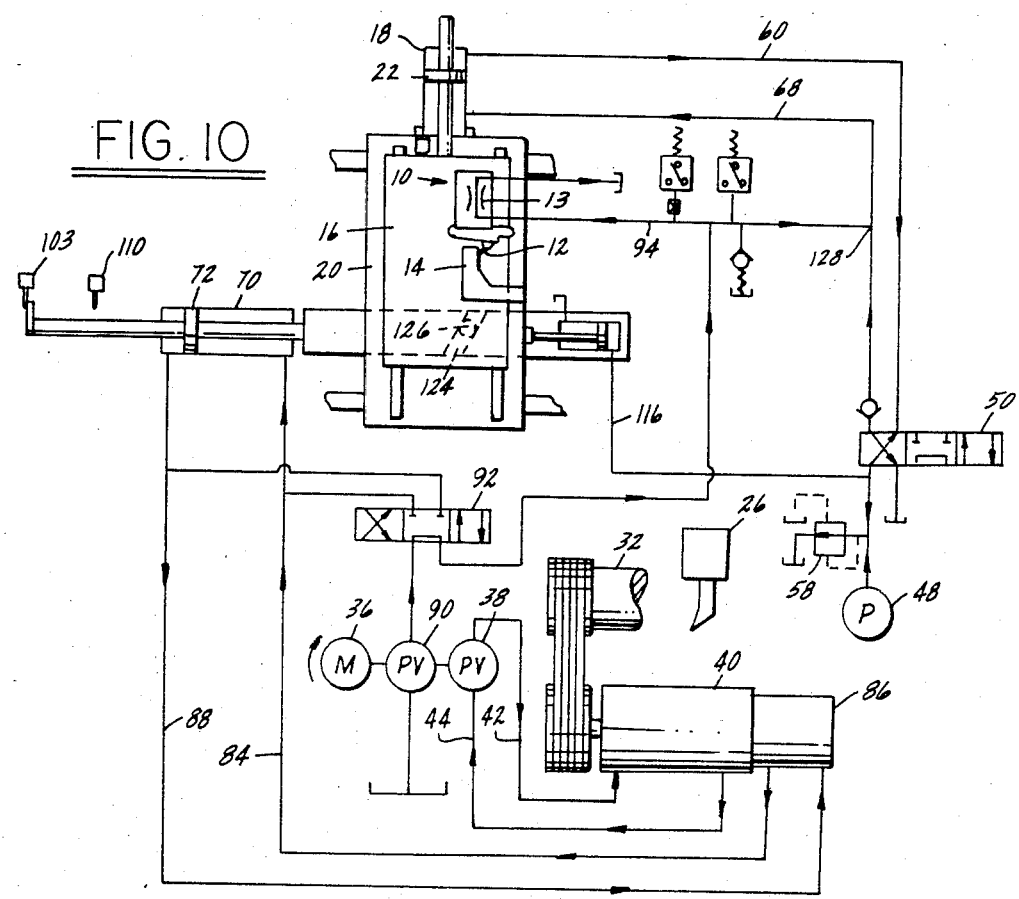

However, as soon as the stylus 12 encounters the inclined edge portion of the template as shown in FIG. 9, the restriction at orifice 13 increases which in turn causes the back pressure in line 94 to correspondingly increase, for example, to 550 p.s.i. Since the line 68 to cylinder 18 is connected with line 94 as at 128, the pressure in the lower end of cylinder 18 is now higher than the pressure at the upper end of cylinder 18 and the cross slide 16 starts to retract on the carriage 20. As the cross slide 16 retracts cam follower 126 moves upwardly and to the right in cam track 124. This causes carriage 20 to be displaced to the right relative to slide 112, the net effect of which is to reduce the rate of movement of the cross slide in the feed direction to the left.

When the stylus of the tracer valve engages the vertically extending edge of the template the restriction at orifice 13 becomes even greater and the back pressure in line 94 correspondingly increases. Thus cross slide 16 is retracted upwardly at a faster rate because of the increase in pressure in line 68. Because of the inclination of cam track 124 and the degree of restriction at orifice 13, carriage 20 is displaced in a direction to the right at the same rate that slide 112 is advanced in the feed direction to the left. Therefore, the carriage remains stationary on the base of the machine and the cutting tool 26 machines a vertical shoulder on the workpiece which corresponds to the vertically extending edge portion of the template.

Figure 11:
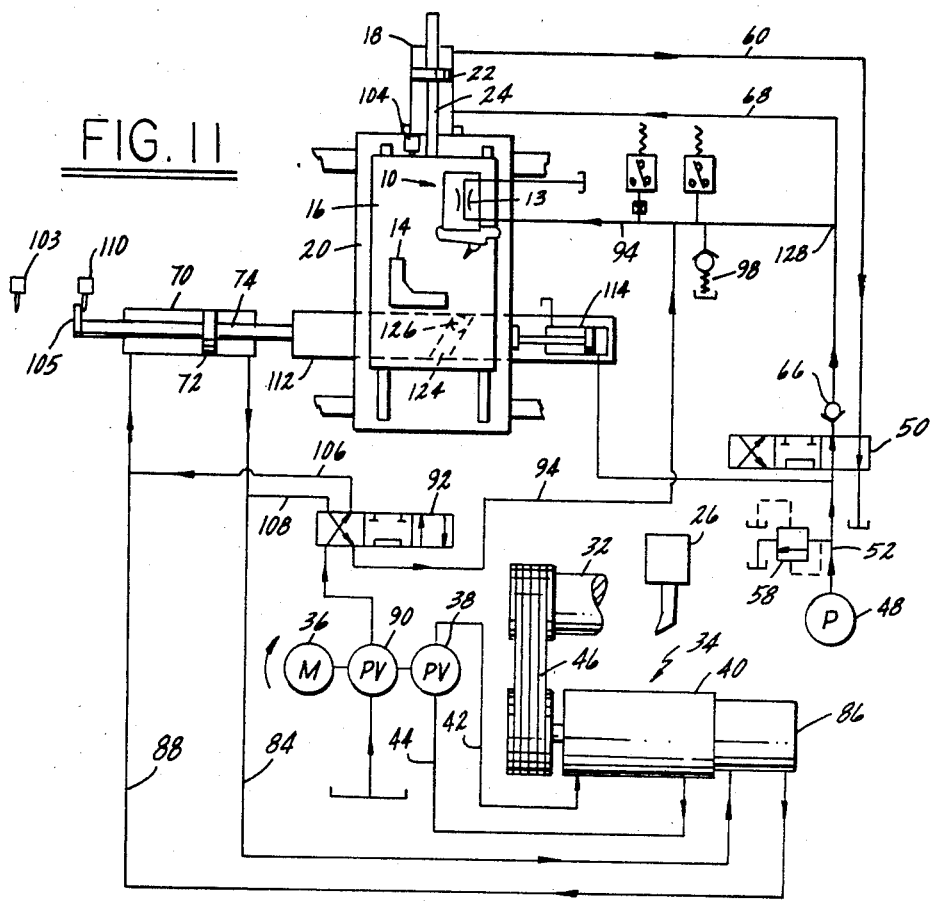

When the stylus rides to the upper end of the template the end-of-cycle switch 103 is tripped, which, as explained previously, initiates the sequence of retracting the cross slide and carriage to their start positions by shifting valves 50, 92 to the positions shown in FIG. 11.

In each of the two embodiments illustrated and described it will be observed that the drive connection between piston rod 74 and carriage 20, that is, cylinder 78 in FIGS. 1 thru 6 and cam track 124 and follower 126 in FIGS. 7 thru 11, is responsive to the differential pressure across piston 22 in cylinder 18 to displace the carriage relative to the piston rod. This controls the ultimate rate of movement of the carriage in the feed direction. When the pressures on the opposite sides of piston 22 are equal, carriage 20 is displaced in the feed direction at the same rate as piston rod 74 moves to the left. When the pressure at the lower end of cylinder 18 exceeds the pressure at the upper end thereof, the rate of travel of the carriage in the feed direction is reduced relative to the rate of displacement of piston 72. When the restriction at orifice 13 is such that the pressure differential across piston 22 reaches a predetermined value, carriage 20 is displaced to the right at the same rate that piston 72 is displaced to the left and the carriage therefore remains stationary.

In the event the template is oriented oppositely from the position shown and it is therefore desired to feed carriage 20 to the right instead of to the left, this can be accomplished very simply. In the arrangement shown in FIGS. 1 thru 6 valve 64 is shifted to the right from its centered position and pump 86 is controlled to feed in the opposite direction. In the arrangement shown in FIGS. 7 thru 11 the cam track is disposed in the oppositely inclined direction as indicated at 130 in FIG. 7 and pump 86 is likewise controlled to feed in the opposite direction.

I claim:

1. In a tracer control circuit for a machine tool of the type including a base, a longitudinally movable carriage on the base and a cross slide mounted on the carriage for movement therewith and also for movement thereon in a direction transversely to the longitudinal path of travel of the carriage, a cutting tool and a tracer valve mounted on the cross slide for movement therewith, said tracer valve having a restrictable orifice for controlling the flow of fluid therethrough and a template fixedly mounted on said base and having a contour corresponding to the contour to be machined on a workpiece, said tracer valve having a stylus thereon movable in response to engagement with the template to thereby variably restrict the flow of fluid through the tracer valve in accordance with the contour of the template and thereby control the longitudinal and transverse paths of travel of the cutting tool, the combination comprising a hydraulic piston cylinder assembly interconnecting the cross slide and the carriage to control movement of the cross slide on the carriage, a first source of hydraulic pressure capable of developing a pressure of a predetermined maximum value, a second source of hydraulic pressure capable of developing a higher pressure than said first source, a first feed line extending from said first pressure source to one end of said cylinder so that the pressure therein biases the cross slide in one direction on the carriage to shift the stylus toward the template, a second feed line extending from said second source to said restrictable orifice, the pressure in said second feed line being determined by the degree of restriction at said orifice, a carriage drive member, means for displacing the carriage drive member at a predetermined rate in the longitudinal feed direction, a second piston cylinder assembly interconnecting the carriage drive member and the carriage for controlling movement of the carriage relative to the drive member in said longitudinal direction, a branch line interconnecting said second feed line with one end of said second cylinder so that the pressure in said one end of the second cylinder tends to displace the carriage relative to the carriage drive member in a direction opposite said longitudinal feed direction, a conduit interconnecting the opposite ends of the two cylinders in closed circuit so that the fluid exhausted from said opposite end of either cylinder is constrained to flow to the opposite end of the other cylinder, whereby, when the stylus engages the template in a manner tending to increase the restriction at the tracer valve, the pressure in the second feed line increases and the pressure at said opposite ends of the two cylinders correspondingly increase so that, when the stylus engages an edge portion of the template contour that extends parallel to said longitudinal direction, the pressure in the second feed line increases to a value that causes the pressure fluid forces on the opposite sides of the piston in the first cylinder to equalize and the cross slide remains stationary relative to the carriage and, when the stylus engages an edge portion on the template contour that is parallel to said transverse direction, the pressure in the second feed line increases to an even higher value such that fluid is displaced from said opposite end of the second cylinder and into said opposite end of the first cylinder at a rate to cause the carriage to shift relative to the carriage drive member at a rate equal to and in a direction opposite the rate and direction the carriage drive member is displaced in the feed direction, whereby the carriage remains stationary relative to said base and the cross slide is displaced on the carriage in a direction opposite to said first-mentioned transverse direction.

2. The combination called for in claim 1 including means responsive to engagement of the stylus with the template to energize said means for displacing the carriage drive member in the feed direction.

3. The combination called for in claim 1 wherein said carriage drive member comprises a third piston cylinder assembly, said third cylinder being fixedly mounted on said base and having its opposite ends connected to the inlet and an outlet of a motor-driven pump, the pistons in the second and third cylinders being interconnected in fixed longitudinally spaced relation by a piston rod extending between the two cylinders.

4. In a tracer control circuit for a machine tool of the type including a base, a longitudinally movable carriage on the base and a cross slide mounted on the carriage for movement therewith and also for movement thereon in a direction transversely to the longitudinal path of travel of the carriage, a cutting tool and a tracer valve mounted on the cross slide for movement therewith, said tracer valve having a restrictable orifice for controlling the flow of fluid therethrough and a template fixedly mounted on said base and having a contour corresponding to the contour to be machined on a workpiece, said tracer valve having a stylus thereon movable in response to engagement with the template to thereby variably restrict the flow of fluid through the tracer valve in accordance with the contour of the template and thereby control the longitudinal and transverse paths of travel of the cutting tool, the combination comprising a hydraulic piston cylinder assembly interconnecting the cross slide and the carriage to control movement of the cross slide on the carriage, a first source of hydraulic pressure capable of developing a pressure of a predetermined maximum value, a second source of hydraulic pressure capable of developing a higher pressure than said first source, a first feed line extending from said first pressure source to one end of said cylinder so that the pressure therein biases the cross slide in one direction on the carriage to shift the stylus toward the template, a second feed line extending from said second source to said restrictable orifice, the pressure in said second feed line being determined by the degree of restriction at said orifice, a branch conduit extending between said second feed line and the opposite end of said cylinder so that the pressure obtaining at said opposite end of the cylinder is determined by the degree of restriction at the tracer valve orifice, the two pressure sources, said cylinder and the tracer valve being arranged such that, when the stylus engages an edge portion of the template contour that extends parallel to said longitudinal direction, the pressure in said second feed lines increases to a value at which the fluid pressure forces on the opposite sides of the piston in said cylinder are equal and the cross slide remains stationary relative to the carriage and, when the stylus engages an edge portion of the template contour that is parallel to said transverse direction, the pressure in the second feed line increases to an even higher value at which the fluid pressure force on the piston at said opposite end of the cylinder exceeds the fluid pressure force on the piston at said one end of the cylinder so that the cross slide is displaced on the carriage in a direction opposite said first-mentioned transverse direction, a member for driving the carriage longitudinally on said base and a cam member and a cam follower member engaged therewith and form a driving connection between the carriage and the carriage drive member, one of said cam and cam follower members being mounted on the cross slide and the other on the carriage drive member, said cam member having a cam track inclined at an acute angle to the longitudinal feed direction of the carriage, the direction of longitudinal inclination of said cam track being such that, when the cross slide is being displaced transversely on the carriage by reason of said even higher pressure in said second feed line, the carriage is also being displaced longitudinally relative to the carriage drive member at a rate equal to and in a direction opposite the rate and direction in which the carriage drive member is being displaced in the feed direction, whereby the carriage remains stationary on the base while the cross slide is displaced transversely on the carriage in said opposite transverse direction.

5. The combination called for in claim 4 including spring means acting between the carriage drive member and the carriage to retain the cam follower member in close and continuous engagement with said inclined cam track.

6. The combination called for in claim 4 wherein said spring comprises a hydraulic piston-cylinder assembly connected with a source of pressure fluid.

* * * * *